(12) United States Patent
Yamamoto (10) Patent No.: US 9,341,139 B2
(45) Date of Patent: May 17, 2016

(54) DRIVE DEVICE DRIVEN BY BUOYANCY AND THERMAL ENERGY

(71) Applicant: Hiroyasu Yamamoto, Iwaki (JP)

(72) Inventor: Hiroyasu Yamamoto, Iwaki (JP)

(*) Notice: Subject to any disclaimer, the term of this patent is extended or adjusted under 35 U.S.C. 154(b) by 0 days.

(21) Appl. No.: 14/771,305

(22) PCT Filed: Mar. 3, 2014

(86) PCT No.: PCT/JP2014/055308
§ 371 (c)(1),
(2) Date: Aug. 28, 2015

(87) PCT Pub. No.: WO2014/148233
PCT Pub. Date: Sep. 25, 2014

(65) Prior Publication Data
US 2016/0010587 A1    Jan. 14, 2016

(30) Foreign Application Priority Data

Mar. 22, 2013   (JP) ................................ 2013-060955

(51) Int. Cl.
*F02G 1/055*    (2006.01)
*F03G 7/06*    (2006.01)
(Continued)

(52) U.S. Cl.
CPC . *F02G 1/055* (2013.01); *F03B 9/00* (2013.01); *F03B 17/02* (2013.01); *F03G 6/00* (2013.01); *F03G 7/04* (2013.01); *Y02E 10/20* (2013.01); *Y02E 10/46* (2013.01)

(58) Field of Classification Search
CPC ............. Y02E 10/20; F03G 7/04; F03G 7/06; F03G 7/10; F02G 1/04; F02G 1/043; F02G 1/047; F02G 1/055; F03B 9/00; F03B 17/00; F03B 17/02; F03B 17/005; F03B 17/025; F03B 17/04

USPC ............ 60/495, 496, 508, 509, 512, 513, 515
See application file for complete search history.

(56) References Cited

U.S. PATENT DOCUMENTS

| | | | | |
|---|---|---|---|---|
| 29,149 A | * | 7/1860 | Durham | .................. F03B 17/02 60/496 |
| 2,513,136 A | * | 6/1950 | Borsos | ....................... B01J 7/02 60/496 |

(Continued)

FOREIGN PATENT DOCUMENTS

| | | |
|---|---|---|
| JP | 59-87281 | 5/1984 |
| JP | 60-175873 | 11/1985 |

(Continued)

OTHER PUBLICATIONS

International Search Report, date of mailing: May 13, 2014.

*Primary Examiner* — Thomas Denion
*Assistant Examiner* — Mickey France
(74) *Attorney, Agent, or Firm* — Rankin, Hill & Clark LLP (57) ABSTRACT

Provided is a drive device efficiently converting thermal energy of a vertical high-temperature tank and a vertical low-temperature tank into a drive force. The volume variable container (11) at a vertical high-temperature tank (1) side is supported on the forward side of a horizontal communication pipe (7) in the travel direction, and the volume variable container (12) at a vertical low-temperature tank (2) is supported on the rear side of the horizontal communication pipe (7) in the travel direction, and enclosed gas is transferred by a pressure difference between the volume variable container (11) and the volume variable container (12). A travel belt 4 travels with respect to an insulation wall (3) due to a total buoyancy difference (F1–F2) between the total buoyancy (F1) of the buoyancy of the volume variable container (11) and the total buoyancy (F2) of the buoyancy of the volume variable container (12).

4 Claims, 4 Drawing Sheets

(51) Int. Cl.
*F03B 9/00* (2006.01)
*F03B 17/02* (2006.01)
*F03G 7/04* (2006.01)
*F03G 6/00* (2006.01)

(56) References Cited

U.S. PATENT DOCUMENTS

| | | | | |
|---|---|---|---|---|
| 2,513,692 A * | 7/1950 | Tubbs | ........................ | F03G 7/06 60/496 |
| 3,934,964 A * | 1/1976 | Diamond | ................ | F03B 17/04 415/5 |
| 4,233,813 A | 11/1980 | Simmons | | |
| 4,325,216 A | 4/1982 | Mermis | | |
| 4,407,130 A * | 10/1983 | Jackson | ................ | F03B 17/02 415/7 |
| 5,555,728 A * | 9/1996 | Welch, Jr. | ............... | F01D 23/00 60/496 |
| 6,764,275 B1 * | 7/2004 | Carr | ........................ | F03B 17/04 415/1 |
| 6,978,610 B2 * | 12/2005 | Carnahan | ............... | F02G 1/0435 60/495 |
| 8,453,442 B1 * | 6/2013 | Tran | ........................ | F03B 17/02 60/495 |
| 2003/0033806 A1 * | 2/2003 | Bittner | ...................... | F03G 7/06 60/675 |
| 2005/0052028 A1 * | 3/2005 | Chiang | ................. | F03B 17/005 290/1 R |
| 2006/0130475 A1 * | 6/2006 | Yu | ........................... | F03B 17/04 60/495 |
| 2006/0218917 A1 * | 10/2006 | Abou-Raphael | ........ | F03B 13/14 60/495 |
| 2010/0024413 A1 * | 2/2010 | Kim | ........................ | F03B 17/02 60/496 |

FOREIGN PATENT DOCUMENTS

| | | |
|---|---|---|
| JP | 11-107901 | 4/1999 |
| JP | 4673367 | 1/2011 |

\* cited by examiner

DRIVE DEVICE DRIVEN BY BUOYANCY AND THERMAL ENERGY

TECHNICAL FIELD

The present invention relates to a drive device which is driven by buoyancy and thermal energy. More specifically, the invention relates to a drive device which is driven by buoyancy and thermal energy, and a device which uses high-temperature and low-temperature thermal energy generated through nature and artificial social activities by using the drive device.

BACKGROUND ART

Hitherto, as disclosed in Patent Document 1 below, there is known a drive device of this type which includes a vertical high-temperature tank (storing a high-temperature liquid) and a vertical low-temperature tank (storing a low-temperature liquid) having bottom portions thereof communicating with each other. Here, a plurality of bag-shaped floating pieces are attached to an endless floating piece support member extending from the vertical high-temperature tank to the vertical low-temperature tank and each floating piece stores a heat medium which becomes a gas state in the vertical high-temperature tank and becomes a liquid state in the vertical low-temperature tank.

According to the drive device of the related art, the heat medium stored in the bag-shaped floating piece becomes expanded in the gas state at the vertical high-temperature tank so as to generate buoyancy and becomes contracted in the liquid state at the vertical low-temperature tank. Accordingly, the endless floating piece support member is rotated by the buoyancy generated at the vertical high-temperature tank.

CITATION LIST

Patent Document
  Patent Document 1: Japanese Patent No. 4673367

DISCLOSURE OF THE INVENTION

Problem to be Solved by the Invention

However, in the drive device of the related art, there is a need to provide the plurality of bag-shaped floating pieces to across the vertical high-temperature tank and the vertical low-temperature tank. Thus, a structure is formed in which the bottom portions of the vertical high-temperature tank and the vertical low-temperature tank communicate with each other.

Here, when the bottom portions of the vertical high-temperature tank and the vertical low-temperature tank communicate with each other, a thermally equal state is actually established in a short time between the vertical high-temperature tank and the vertical low-temperature tank due to the flow (in and out) of the heat through the bottoms. As a result, a problem arises in that the gas-liquid change of the heat medium does not occur.

In view of the above-described circumstances, an object of the invention is to provide a drive device capable of efficiently converting thermal energy of a vertical high-temperature tank and a vertical low-temperature tank into a drive force and to further provide a device which uses high-temperature and low-temperature thermal energy generated through nature and artificial social activities by using the drive device.

Means for Solving Problem

According to a first aspect, provided is a drive device which is driven by buoyancy and thermal energy, the drive device including: a vertical high-temperature tank which stores a high-temperature liquid; a vertical low-temperature tank which stores a low-temperature liquid, which is provided adjacent to the vertical high-temperature tank; an insulation wall which is provided between the vertical high-temperature tank and the vertical low-temperature tank; a travel belt which is formed in an annular shape in the insulation wall and is movable with respect to the insulation wall; a plurality of horizontal communication pipes which causes the vertical high-temperature tank and the vertical low-temperature tank to communicate with each other across the travel belt; a pair of volume variable containers which are provided in each of the plurality of horizontal communication pipes and are supported by each of both ends of the horizontal communication pipe while inside thereof communicates with the inside of the horizontal communication pipe; and an enclosed gas which is enclosed in the horizontal communication pipes and the pair of volume variable containers, wherein the pair of volume variable containers includes a transfer element that is configured to transfer the enclosed gas between the volume variable container of the vertical high-temperature tank and the volume variable container of the vertical low-temperature tank so that the enclosed gas stays in the volume variable container of the vertical low-temperature tank during a downward movement and the enclosed gas stays in the volume variable container of the vertical high-temperature tank during an upward movement, and wherein the travel belt is made to travel with respect to the insulation wall due to a total buoyancy difference between total buoyancy of buoyancy of the volume variable containers of the vertical high-temperature tank and total buoyancy of buoyancy of the volume variable containers of the vertical low-temperature tank among a plurality of the pair of volume variable containers supported by the travel belt through the horizontal communication pipes.

According to the drive device of the first aspect of the invention, the enclosed gas is transferred by the transfer element so that the enclosed gas stays at the volume variable container of the vertical low-temperature tank during the downward movement and the enclosed gas stays at the volume variable container of the vertical high-temperature tank during the upward movement.

At this time, the total buoyancy of the buoyancy of the volume variable containers of the vertical high-temperature tank and the total buoyancy of the buoyancy of the volume variable containers of the vertical low-temperature tank among the plural pairs of volume variable containers supported by the travel belt through the horizontal communication pipes are set so that the total buoyancy of the vertical high-temperature tank having a large thermal expansion amount becomes larger than the total buoyancy of the vertical low-temperature tank. By such a total buoyancy difference, the travel belt may be driven so that the volume variable container of the vertical high-temperature tank is located at the upper side in the travel direction. Then, the travel belt may be driven until the thermal energy of the liquid of the vertical high-temperature tank and the thermal energy of the liquid of the vertical low-temperature tank become a thermally equal state in accordance with the transfer of the enclosed gas, and hence may be driven as long as the high-temperature thermal energy and the low-temperature thermal energy are supplied. In other words, the travel belt is driven when the thermal energy of the liquid of the vertical high-temperature tank is transferred to the thermal energy of the liquid of the vertical low-temperature tank through the enclosed gas in accordance with the transfer of the enclosed gas using the transfer element.

In this way, according to the drive device of the first aspect of the invention, it is possible to efficiently convert the thermal energy of the vertical high-temperature tank and the vertical low-temperature tank into a drive force while the vertical high-temperature tank and the vertical low-temperature tank are completely shielded.

According to a second aspect of the invention, provided is the drive device according to the first aspect of the invention, wherein each of the pair of volume variable containers is a pressure variable container which is deformed by a pressure of the liquid, the volume variable container of the vertical high-temperature tank is supported on a forward side of the horizontal communication pipe in a travel direction, and the volume variable container of the vertical low-temperature tank is supported on a rear side of the horizontal communication pipe in the travel direction, and wherein the transfer element is a pressure difference of the liquid corresponding to a depth of the liquid of the volume variable container of the vertical high-temperature tank and the volume variable container of the vertical low-temperature tank.

According to the drive device of the second aspect of the invention, when each of the pair of volume variable containers is provided so that the volume variable container of the vertical high-temperature tank is located at the upper side in the travel direction and the volume variable container of the vertical low-temperature tank is located at the lower side in the travel direction, the enclosed gas is transferred from the volume variable container of the vertical low-temperature tank at a deeper position to the volume variable container of the vertical high-temperature tank at a shallower position in accordance with the depth of the liquid, and hence the volume variable container of the vertical high-temperature tank is expanded so as to generate buoyancy.

Meanwhile, when the volume variable container of the vertical high-temperature tank is located at the lower side in the travel direction and the volume variable container of the vertical low-temperature tank is located at the upper side in the travel direction, the enclosed gas is transferred from the volume variable container of the vertical high-temperature tank at a deeper position to the volume variable container of the vertical low-temperature tank at a shallower position in accordance with the depth of the liquid, and hence the volume variable container of the vertical low-temperature tank is expanded so as to generate buoyancy.

At this time, in the total buoyancy of the buoyancy of the volume variable containers of the vertical high-temperature tank and the total buoyancy of the buoyancy of the volume variable containers of the vertical low-temperature tank among the plural pairs of volume variable containers supported by the travel belt through the horizontal communication pipes, the total buoyancy of the vertical high-temperature tank having a large thermal expansion amount becomes larger than the total buoyancy of the vertical low-temperature tank. By such a total buoyancy difference, the travel belt may be driven so that the volume variable container of the vertical high-temperature tank is located at the upper side in the travel direction.

Then, the travel belt may be driven until the thermal energy of the liquid of the vertical high-temperature tank and the thermal energy of the liquid of the vertical low-temperature tank become thermally equal to each other in accordance with the transfer of the enclosed gas, and hence may be driven as long as the high-temperature thermal energy and the low-temperature thermal energy are supplied.

Further, a pump that transfers the enclosed gas is not needed as the transfer element. Accordingly, it is possible to transfer the enclosed gas from the volume variable container at a deep position to the volume variable container at a shallow position due to the pressure difference corresponding to the depth of the liquid.

In this way, according to the drive device of the second aspect of the invention, it is possible to realize a configuration in which the thermal energy of the vertical high-temperature tank and the vertical low-temperature tank is efficiently converted into a drive force while the vertical high-temperature tank and the vertical low-temperature tank are completely shielded.

According to a third aspect of the invention, provided is the drive device according to the first or second aspect of the invention, further including: a heat collector; a high-temperature heat storage tank which is filled with a liquid medium and a latent heat storage material capsule; and a heat radiator; and a low-temperature heat storage tank which is filled with a liquid medium and a latent heat storage material capsule, wherein the liquid of the vertical high-temperature tank is directly returned to the high-temperature heat storage tank storing heat collected by the heat collector or is returned thereto through a heat exchanger, and wherein the liquid of the vertical low-temperature tank is directly returned to the low-temperature heat storage tank storing heat by radiation of the heat radiator or is returned thereto through a heat exchanger.

According to the drive device of the third aspect of the invention, in the first or second aspect of the invention, the travel belt may be driven until the thermal energy of the liquid of the vertical high-temperature tank and the thermal energy of the liquid of the vertical low-temperature tank become a thermally equal state in accordance with the transfer of the enclosed gas, and hence may be driven as long as the high-temperature thermal energy and the low-temperature thermal energy are supplied. Then, the liquid of the vertical high-temperature tank is directly returned to the high-temperature heat storage tank which stores thermal energy by the collection of the heat collector or is returned thereto through the heat exchanger, and the liquid of the vertical low-temperature tank is directly returned to the low-temperature heat storage tank which stores thermal energy by the radiation of the heat radiator or is returned thereto through the heat exchanger. Accordingly, it is possible to continuously and stably generate an energy difference between the thermal energy of the liquid of the vertical high-temperature tank and the thermal energy of the liquid of the vertical low-temperature tank and hence to continuously and stably convert the constantly changing thermal energy of the heat supply source and the heat absorption source into a drive force with efficiency.

According to a fourth aspect of the invention, provided is the drive device according to the first or second aspect of the invention, further including: a heat collector; a high-temperature heat storage tank which is filled with a liquid medium and a latent heat storage material capsule; and a heat radiator, wherein the liquid of the vertical high-temperature tank is directly returned to the high-temperature heat storage tank storing heat collected by the heat collector or is returned thereto through a heat exchanger, and wherein the liquid of the vertical low-temperature tank is directly returned to the heat radiator or is returned thereto through a heat exchanger.

According to the drive device of the fourth aspect of the invention, in the third aspect of the invention, the low-temperature heat storage tank may not be provided. Even in this case, the travel belt may be driven until the thermal energy of the liquid of the vertical high-temperature tank and the thermal energy of the liquid of the vertical low-temperature tank become thermally equal to each other in accordance with the transfer of the enclosed gas, and hence may be driven as long as the high-temperature thermal energy and the low-temperature thermal energy are supplied.

In this case, the liquid of the vertical high-temperature tank is directly returned to the high-temperature heat storage tank which stores thermal energy by the collection of the heat collector or is returned thereto through the heat exchanger, and the liquid of the vertical low-temperature tank is directly returned to the heat radiator which radiates thermal energy to the stable heat absorption source or is returned thereto through the heat exchanger. Accordingly, it is possible to continuously and stably generate an energy difference between the thermal energy of the liquid of the vertical high-temperature tank and the thermal energy of the liquid of the vertical low-temperature tank and hence to continuously and stably convert the constantly changing thermal energy of the heat supply source and the stable heat absorption source into a drive force with efficiency.

MODE(S) FOR CARRYING OUT THE INVENTION

Figure 1:
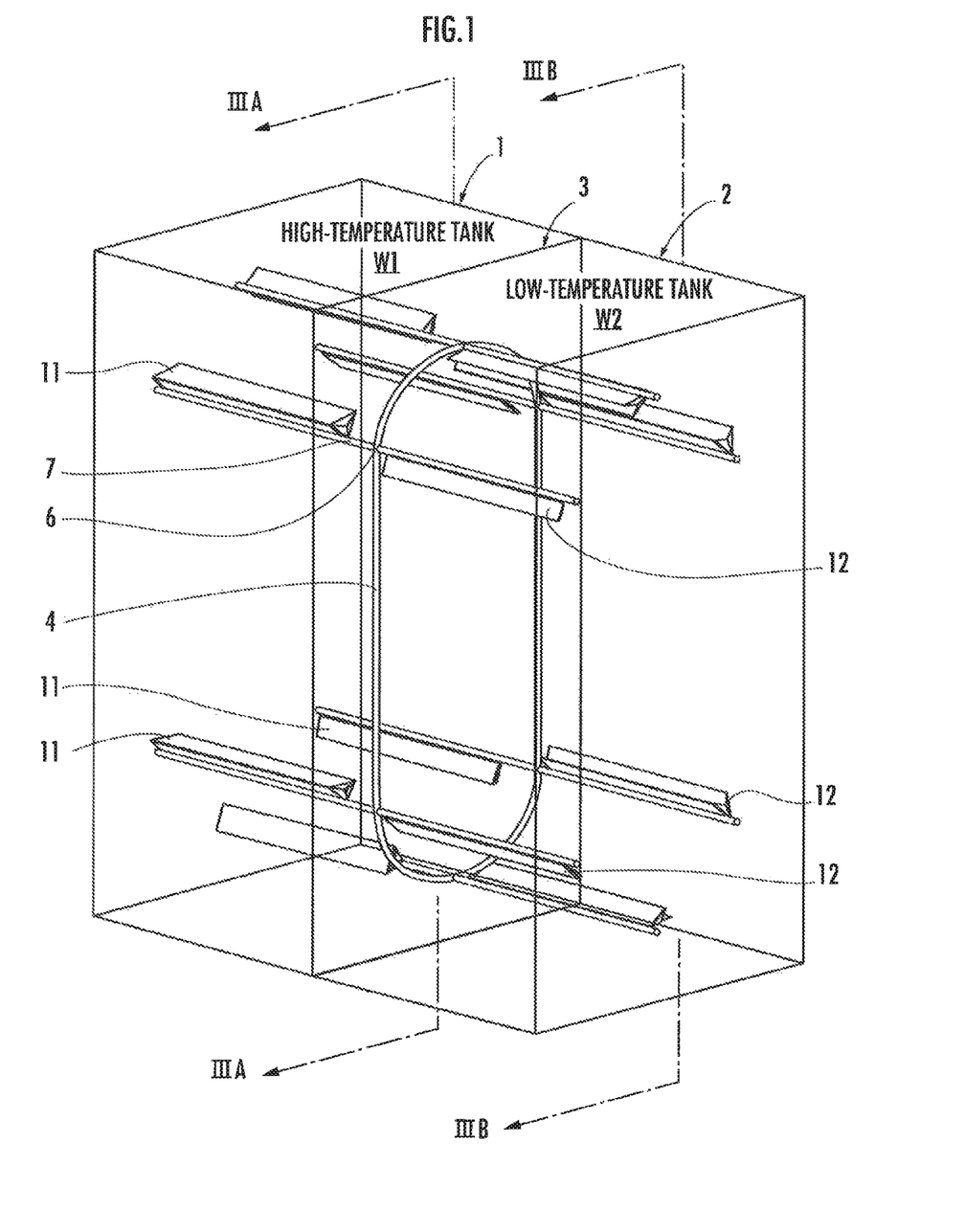
FIG. 1 is a perspective view illustrating an entire configuration of a drive device of an embodiment.

As illustrated in FIG. 1, a drive device of an embodiment is a device which is driven by buoyancy and thermal energy, and includes a vertical high-temperature tank 1 which stores a high-temperature liquid W1 and a vertical low-temperature tank 2 which stores a low-temperature liquid W2.

Each of the vertical high-temperature tank 1 and the vertical low-temperature tank 2 is a container which is formed by an insulation wall, and an annular travel belt 4 is provided in an insulation wall 3 between the vertical high-temperature tank and the vertical low-temperature tank.

Figure 3A:
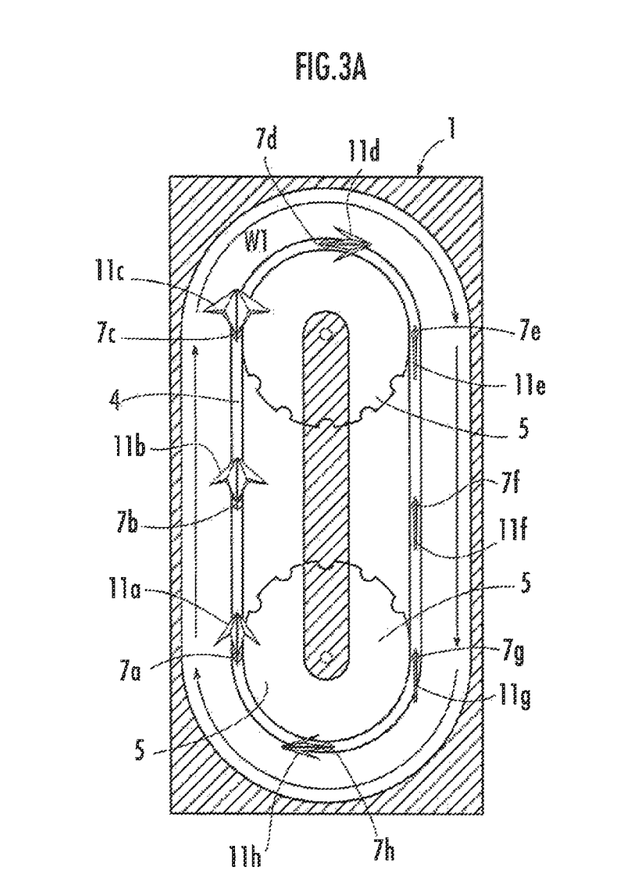
FIG. 3A is a cross-sectional view taken along the line IIIA-IIIA of the drive device of FIG. 1
Figure 3B:
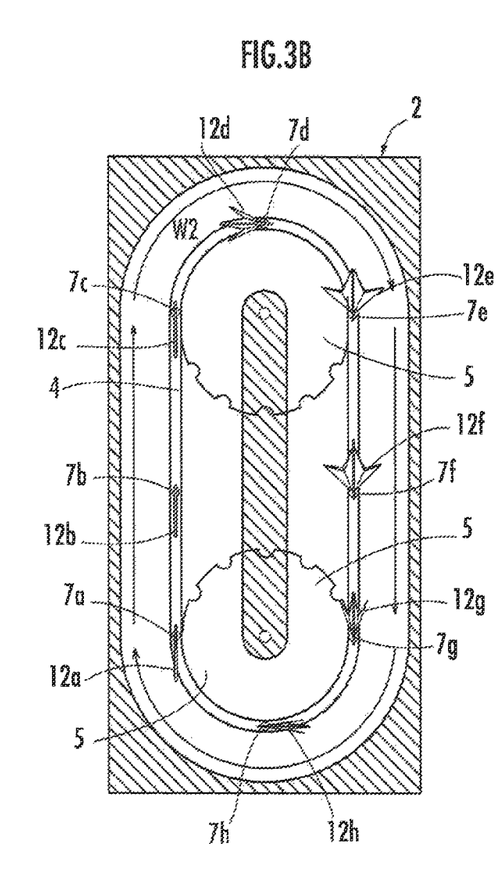
FIG. 3B is a cross-sectional view taken along the line IIIB-IIIB of the drive device of FIG. 1.

The travel belt 4 is, for example, a rubber crawler, and is movable with respect to the insulation wall 3 by a sprocket 5 (see FIGS. 3A and 3B).

The travel belt 4 is provided with a plurality of penetration holes 6, and a horizontal communication pipe 7 is inserted into each of the penetration holes 6.

Each horizontal communication pipe 7 causes the vertical high-temperature tank 1 and the vertical low-temperature tank 2 to communicate with each other across the travel belt 4, and a pair of volume variable containers 11 and 12 is attached to both ends of each horizontal communication pipe 7.

In the pair of volume variable containers 11 and 12, the inside thereof communicates with the inside of the horizontal communication pipe 7, and an enclosed gas may flow into and out of the high-temperature side volume variable container 11 and the low-temperature side volume variable container 12 through the horizontal communication pipe 7. Further, the volume variable containers 11 and 12 are formed as pressure variable containers which are deformed by the pressure of the liquids W1 and W2.

Here, in the pair of volume variable containers 11 and 12, the volume variable container 11 at the vertical high-temperature tank 1 is supported on the front side of the horizontal communication pipe 7 in the travel direction, and the volume variable container 12 at the vertical low-temperature tank 2 is supported on the rear side of the horizontal communication pipe 7 in the travel direction.

An argon gas (corresponding to an enclosed gas of the invention) as an enclosed gas is enclosed in the pair of volume variable containers 11 and 12 and the horizontal communication pipe 7 communicating with the pair of volume variable containers. In addition, the reason why the argon gas is adopted is that the specific heat at constant pressure is small.

Next, the pair of volume variable containers 11 and 12 will be described with reference to FIG. 2.

The center of the horizontal communication pipe 7 which supports the pair of volume variable containers 11 and 12 is inserted into the penetration hole 6 of the travel belt 4. Each of the pair of volume variable containers 11 and 12 is formed as a bag which is widened in the up and down direction at both sides of the horizontal communication pipe 7 with respect to the travel belt 4.

Figure 2:
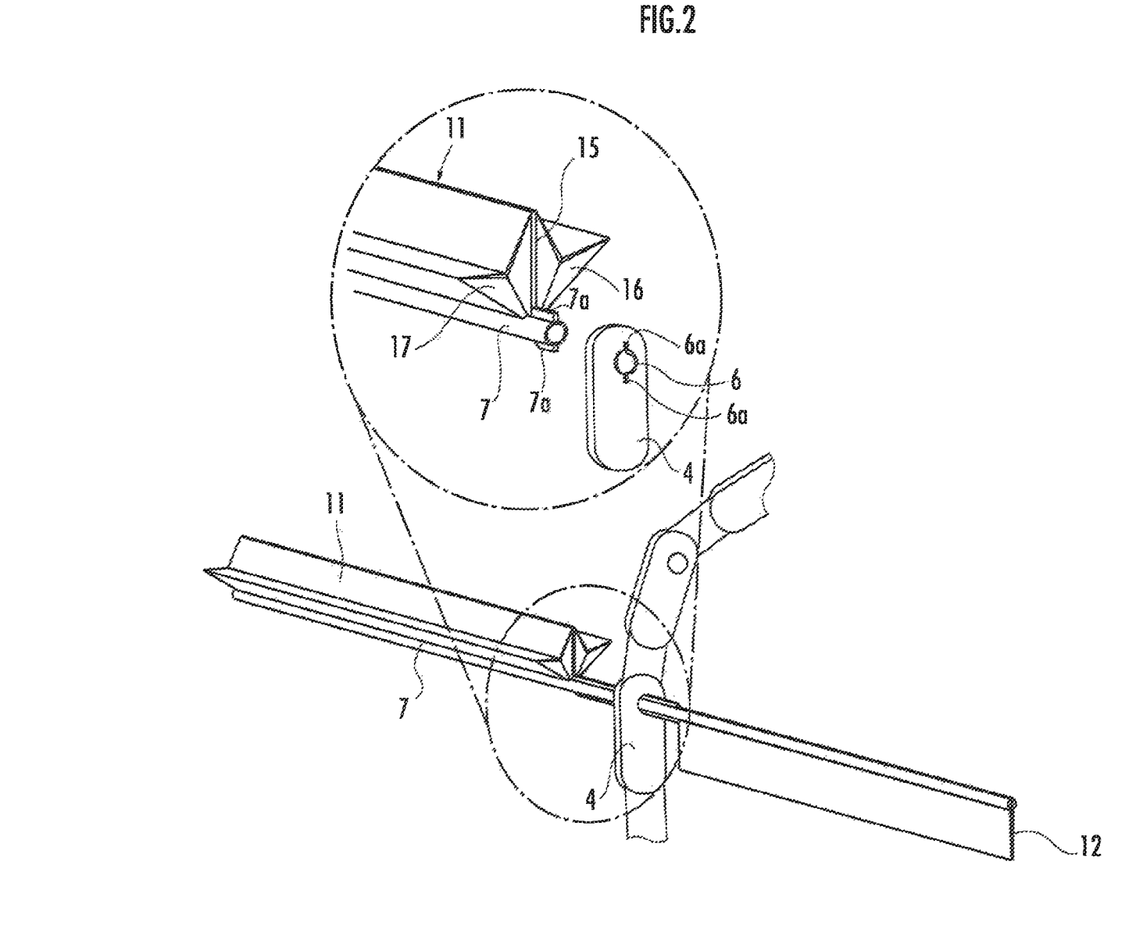
FIG. 2 is a diagram specifically illustrating a horizontal communication pipe and volume variable containers of the drive device of FIG. 1.

Specifically, as indicated by the enlarged diagram of FIG. 2, the volume variable container 11 includes bags 16 and 17 which are widened in the right and left direction with respect to a support body 15 formed uprightly in the installation direction (the up direction of the drawing), and the bags 16 and 17 communicate with the inside of the horizontal communication pipe 7.

When the bags 16 and 17 are contracted (as indicated as the volume variable container 12 in FIG. 2), the bags are folded along the support body 15 so as to become a flat plate shape, and hence the propelling resistance between the liquids W1 and W2 inside the tanks decreases.

In addition, the horizontal communication pipe 7 is provided with an engagement portion 7a which regulates the rotation with respect to the penetration hole 6 of the travel belt 4, and the penetration hole 6 is provided with an engagement receiving portion 6a in accordance with this configuration. Accordingly, the upright installation direction of the support body 15 is prevented from deviating the travel direction (the up and down direction of the drawing) by the rotation of the horizontal communication pipe 7 with respect to the travel belt 4.

In addition, both bags 16 and 17 widened in the right and left direction with respect to the support body 15 have the same function, and hence any one of the bags 16 and 17 may not be provided.

Next, an operation of the drive device with the above-described configuration will be described with reference to FIG. 3.

In the pair of volume variable containers 11 and 12, the volume variable container 11 at the vertical high-temperature tank 1 is supported on the forward side of the horizontal communication pipe 7 in the travel direction, and the volume variable container 12 at the vertical low-temperature tank 2 is supported on the rear side of the horizontal communication pipe 7 in the travel direction. For that reason, the up and down positions of the pair of volume variable containers are reversed by the up and down travel direction.

In FIGS. 3A and 3B, the volume variable container 11 at the vertical high-temperature tank 1 is located at an upper side of the volume variable container 12 at the vertical low-temperature tank 2 (the volume variable container 12 at the vertical low-temperature tank 2 is located below the volume variable container 11 at the vertical high-temperature tank 1) at the left area of the drawing in the plurality of the pair of volume variable containers 11 and 12 supported by the travel belt 4.

Meanwhile, the volume variable container 11 at the vertical high-temperature tank 1 is located at a lower side the volume variable container 12 at the vertical low-temperature tank 2 (the volume variable container 12 at the vertical low-temperature tank 2 is located above the volume variable container 11 at the vertical high-temperature tank 1) at the right area of the drawing.

First, when the volume variable container 11 at the vertical high-temperature tank 1 is located at the upper position in the travel direction and the volume variable container 12 at the vertical low-temperature tank 2 is located at the lower position in the travel direction, an argon gas is transferred from the volume variable container 12 at the vertical low-temperature tank 2 located at the lower deep position to the volume variable container 11 at the vertical high-temperature tank 1 located at the upper shallow position in accordance with the depth of the liquids W1 and W2, and the volume variable container 11 at the vertical high-temperature tank 1 is expanded so that buoyancy is generated.

For that reason, the volume variable containers 11a, 11b, and 11c at the vertical high-temperature tank 1 are expanded so as to be swollen and the corresponding pair of volume variable containers 12a, 12b, and 12c at the vertical low-temperature tank 2 are contracted so as to become a flat plate shape at the left area of the drawing.

In addition, the different swollen degree of the volume variable containers 11a, 11b, and 11c at the vertical high-temperature tank 1 is caused by the liquid pressure of the liquid W1. That is, the swollen portions of the volume variable containers 11a, 11b, and 11c at the vertical high-temperature tank 1 increase in size in inversely proportional to the depth of the liquid W11.

Meanwhile, when the volume variable container 11 at the vertical high-temperature tank 1 is located at the lower position in the travel direction and the volume variable container 12 at the vertical low-temperature tank 2 is located at the upper position in the travel direction, an argon gas is transferred from the volume variable container 11 at the vertical high-temperature tank 1 located at the lower deep position to the volume variable container 12 at the vertical low-temperature tank 2 located at the upper shallow position in accordance with the depth of the liquids W1 and W2, and the volume variable container 12 at the vertical low-temperature tank 2 is swollen so that buoyancy is generated.

For that reason, the volume variable containers 11e, 11f, and 11g at the vertical high-temperature tank 1 are contracted so as to become a flat plate shape, and their corresponding pairs of volume variable containers 12e, 12f, and 12g at the vertical low-temperature tank 2 are expanded so as to be swollen at the right area of the drawing.

In addition, the different swollen degree of the volume variable containers 12e, 12f, and 12g at the vertical low-temperature tank 2 is caused by the liquid pressure of the liquid W2. That is, the swollen portions of the volume variable containers 12e, 12f, and 12g at the vertical low-temperature tank 2 increase in size in inversely proportional to the depth of the liquid W2.

Further, a transition state from the left area to the right area in the drawing occurs through the volume variable container 11d at the vertical high-temperature tank 1 (the volume variable container 12d at the vertical low-temperature tank 2) and the volume variable container 11h at the vertical high-temperature tank 1 (the volume variable container 12h at the vertical low-temperature tank 2) which are in the intermediate state.

Next, a drive force which is generated at the travel belt 4 will be described.

In the plural pairs of volume variable containers 11 and 12 supported by the travel belt 4 through the horizontal communication pipe 7, the drive force generated in the travel belt 4 becomes the total buoyancy difference (F1–F2) between the total buoyancy F1 of the buoyancy of the volume variable container 11 at the vertical high-temperature tank 1 and the total buoyancy F2 of the buoyancy of the volume variable container 12 at the vertical low-temperature tank 2.

At this time, since the total buoyancy F1 of the vertical high-temperature tank 1 having a large thermal expansion amount becomes larger than the total buoyancy F2 of the vertical low-temperature tank, the travel belt 4 is driven so that the volume variable container 11 at the vertical high-temperature tank 1 is located at the upper position in the travel direction.

The travel belt 4 may be driven until the thermal energy of the liquid W1 at the vertical high-temperature tank 1 and the thermal energy of the liquid W2 at the vertical low-temperature tank 2 become thermally equal to each other in accordance with the transfer of the argon gas, and hence may be driven as long as the high-temperature thermal energy and the low-temperature thermal energy are supplied.

For that reason, as another viewpoint of the drive device, the travel belt 4 is driven when the thermal energy of the liquid at the vertical high-temperature tank 1 and the thermal energy of the liquid at the vertical low-temperature tank 2 are transferred through the argon gas.

In addition, in the pair of volume variable containers 11 and 12, a plurality of annular movement paths forming the horizontal communication pipe 7, and the drive force may be transmitted by a metallic chain and a sprocket exhibiting a strong drive force and provided in a row or two rows at both sides of the vertical high-temperature tank and the vertical low-temperature tank instead of the travel belt 4, and the travel belt 4 may be used for only the insulation of the vertical high-temperature tank and the vertical low-temperature tank. Further, the annular movement path may be a circle instead of an elongated circle.

Accordingly, according to the drive device of the embodiment, the thermal energy of the vertical high-temperature tank 1 and the vertical low-temperature tank 2 may be efficiently converted into a drive force while the vertical high-temperature tank 1 and the vertical low-temperature tank 2 are completely shielded.

Figure 4:
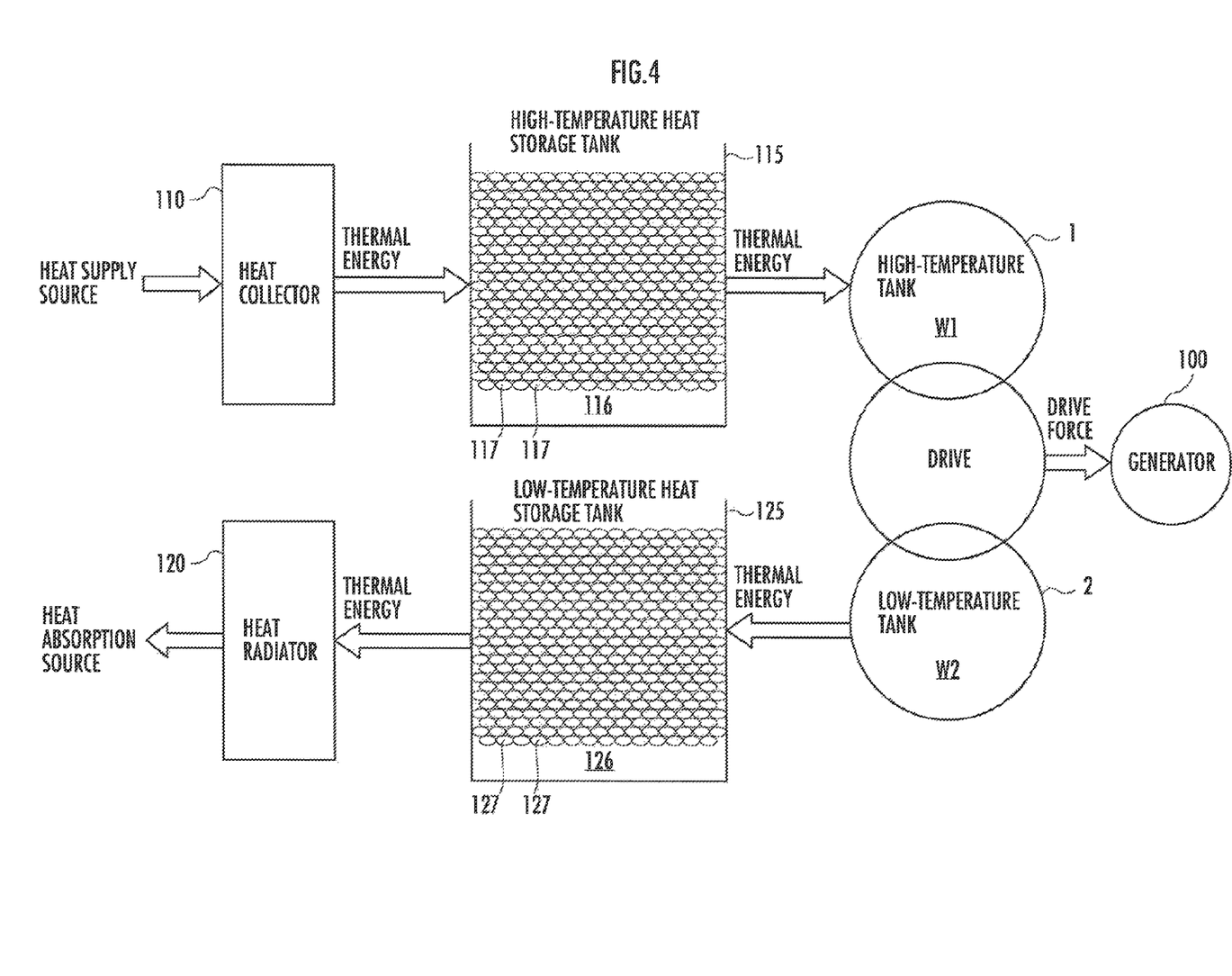
FIG. 4 is a diagram illustrating an enlarged example of the drive device of FIG. 1.

Here, as illustrated in FIG. 4, the liquid W1 at the vertical high-temperature tank 1 may be directly returned to a high-temperature heat storage tank 115 filled with a liquid medium 116 and a latent heat storage material capsule 117 storing heat by the collection of a heat collector 110 or may be returned thereto through a heat exchanger (not illustrated).

Further, the liquid W2 at the vertical low-temperature tank 2 may be directly returned to a low-temperature heat storage tank 125 filled with a liquid medium 126 and a latent heat storage material capsule 127 storing heat by the radiation of a heat radiator 120 or may be returned thereto through a heat exchanger (not illustrated).

Accordingly, an energy difference between the thermal energy of the liquid W1 at the vertical high-temperature tank 1 and the thermal energy of the liquid W2 at the vertical low-temperature tank 2 may be continuously and stably generated.

In addition, in this case, the low-temperature heat storage tank 125 filled with the liquid medium 126 and the latent heat storage material capsule 127 may not be provided so that the liquid W2 at the vertical low-temperature tank 2 may be directly returned to a heat radiator directly and stably radiating heat to a heat absorption source or may be returned thereto through a heat exchanger (not illustrated).

In FIG. 4, the high-temperature heat storage tank 115 which stores thermal energy by the collection of the heat collector 110 includes the liquid medium 116 and the latent heat storage material capsule 117, and stores the thermal energy collected by the heat collector 110 at a constant temperature. Accordingly, the thermal energy is stably supplied to the liquid W1 at the vertical high-temperature tank 1 at all times, and the recirculation amount is adjusted, so that the temperature of the vertical high-temperature tank 1 may be changed and the drive force may be adjusted.

At this time, as the heat supply source which supplies heat collected by the heat collector 110, any thermal energy such as solar energy, waste heat generated from a power plant, heat generated by burning garbage, waste heat generated from a factory, waste heat generated by a cooling operation, waste heat generated by a refrigerating operation, terrestrial heat, and heat generated from a hot spring which are produced by a nature and artificial social activities may be used. Further, the thermal energy may be used and the energy may be saved with high efficiency while the energy is used together for a warming operation and a water heating operation.

Meanwhile, the low-temperature heat storage tank 125 which stores thermal energy by the radiation of the heat radiator 120 includes the liquid medium 126 and the latent heat storage material capsule 127, and stores the thermal energy radiated by the heat radiator 120 at a constant temperature. Accordingly, the thermal energy is stably supplied to the liquid W2 at the vertical low-temperature tank 2 at all times, and the recirculation amount is adjusted, so that the temperature of the vertical low-temperature tank 2 may be changed and the drive force may be adjusted. Alternatively, the thermal energy may be directly radiated to the stable heat absorption source through the heat radiator 120.

At this time, heat radiated to an outer space and vaporization heat of snow, ice, cold air, or a liquefied gas may be considered as the heat absorption source which absorbs heat to be radiated by the heat radiator 120, and the stable heat absorption source may directly use any thermal energy which is generated from a nature such as an underground place, ground water, sea water, river water, pond water, and lake water and energy generated by artificial social activities. Further, the thermal energy may be used and the energy may be saved with high efficiency while the energy is used together for a cooling operation and a refrigerating operation.

Then, a drive force which is generated by the travel belt 4 is rotational movement energy and this rotational movement energy may be easily converted into electric energy by a generator 100 or the like.

In this way, when the drive device includes the heat collector 110, the high-temperature heat storage tank 115 having the latent heat storage material capsule 117 and the liquid medium 116 mixed therein, the heat radiator 120, and the low-temperature heat storage tank 125 having the latent heat storage material capsule 127 and the liquid medium 126 mixed therein or configuring the heat radiator 120 directly radiating heat to a stable heat absorption source and the generator 100, it is possible to connect any thermal energy generated in an unstable or intermittent state from a natural and artificial social activities into stable electric energy and to use the thermal energy for a warming operation, a water heating operation, a cooling operation, and a refrigerating operation. As such, the drive device may be constructed in the vicinity of a place that consumes the electric energy and the thermal energy. Thus, it is possible to solve many problems caused when electric energy is generated from a nuclear power plant, a fossil fuel plant using fossil fuel such as oil, coal, and a natural gas, a wind power plant, and a solar panel or the like.

Hereinbefore, the drive device of the embodiment has been described. According to the drive device of the above-described embodiment, the thermal energy of the vertical high-temperature tank 1 and the vertical low-temperature tank 2 may be efficiently converted into a drive force while the vertical high-temperature tank 1 and the vertical low-temperature tank 2 are completely shielded.

In addition, in the pair of volume variable containers 11 and 12 of the drive device of the embodiment, the volume variable container 11 at the vertical high-temperature tank 1 is supported on the forward side of the horizontal communication pipe 7 in the travel direction, the volume variable container 12 at the vertical low-temperature tank 2 is supported on the rear side of the horizontal communication pipe 7 in the travel direction, and an argon gas therein is transferred by the pressure difference between the liquids W1 and W2 of the vertical high-temperature tank 1 and the vertical low-temperature tank 2. However, the invention is not limited to the configuration.

For example, a configuration may be employed in which a floating piece or a weight is provided in a part of the volume variable containers 11 and 12 supported by both ends of the horizontal communication pipe 7 and an enclosed gas is transferred between the vertical high-temperature tank and the vertical low-temperature tank by the buoyancy or the gravity based on the principle that the upper and lower positions of the volume variable containers at the vertical high-temperature tank side and the vertical low-temperature tank side are reversed.

Even in this case, the volume variable container at the vertical high-temperature tank 1 is expanded so as to generate buoyancy, and the total buoyancy F1 of the buoyancy of the volume variable container 11 at the vertical high-temperature tank 1 and the total buoyancy F2 of the buoyancy of the volume variable container 12 at the vertical low-temperature tank 2 among the plural pairs of volume variable containers 11 and 12 supported by the travel belt 4 through the horizontal communication pipe 7 are set so that the total buoyancy F1 at the vertical high-temperature tank 1 having a large thermal expansion amount becomes larger than the total buoyancy F2 at the vertical low-temperature tank 2. Based on the total buoyancy difference (F1−F2), the travel belt 4 may be driven so that the volume variable container 11 at the vertical high-temperature tank 1 is located at the upper position in the travel direction.

EXAMPLES

Hereinafter, examples of the drive device of the embodiment will be described.

On the assumption that the positions of the liquid levels of the vertical high-temperature tank 1 and the vertical low-temperature tank 2 are indicated by $d_0$ [m], the pressure is indicated by $p_0$ [atm], water or an antifreezing solution is used as the liquid W1 of the vertical high-temperature tank 1 and the liquid W2 of the vertical low-temperature tank 2, the density ρ is set to 1 [kg/l], the pressure of the effective depth $d_1$ (a shallow position) is indicated by $p_1$, the pressure of the effective depth $d_2$ (a deep position) is indicated by $p_2$, and the depth variable x (reference $d_1$) is set, the following equations are obtained.

$p_0=1$ [atm] (changing in an external pressure due to an altitude)

$p_1=p_0+\rho \times 0.1 \times d_1$ [atm]

$p_2=p_0+\rho \times 0.1 \times d_2$ [atm]

$p=p_0+\rho \times 0.1 \times d_1+\rho \times 0.1 \times x$ [atm]

On the assumption that the volume of the enclosed gas (argon) at the effective depth $d_2$ of the vertical low-temperature tank is indicated by $v_0$, the volume of the enclosed gas (argon) at the effective depth $d_2$ of the vertical high-temperature tank is indicated by $v_1$, the volume of the enclosed gas (argon) at the effective depth $d_1$ of the vertical high-temperature tank is indicated by $v_2$, and the volume of the enclosed gas (argon) at the effective depth $d_1$ of the vertical low-temperature tank is indicated by $v_3$, the enclosed gas (argon) changes due to the temperature $t_1$ of the vertical high-temperature tank, the temperature $t_2$ of the vertical low-temperature tank, and the pressure p.

$v_1$ set as reference $v_2=v_1 \times p_2/p_1$ $v_3=v_2 \times (273.15+t_2)/(273.15+t_1)=v_1 \times (p_2/p_1) \times (273.15+t_2)/(273.15+t_1)$ $v_0=v_3 \times p_1/p_2=v_1 \times (p_2/p_1) \times (273.15+t_2)/(273.15+t_1) \times (p_1/p_2)=v_1 \times (273.15+t_2)/(273.15+t_1)$ The relation of the volume v, the pressure p, the temperature t, and the used mole number n (mol) of the enclosed gas (argon) is set as below.

Pressure $p_0=1$ [atm]
Temperature $t_0=0$[° C.]
Volume $v_m$ of enclosed gas of gas molecule of 1 [mol]=22.4 [l]

$v \times p/(273.15+t)=n \times v_m \times p_0/(273.15+t_0)$ $v=n \times v_m \times (p_0/p) \times ([273.15+t]/[273.15+t_0])=22.4 \times n \times (1/p) \times ([273.15+t]/273.15)=0.08201 \times n \times (273.15+t)/p$ [l]

The calculation condition is set as below.
Temperature $t_1=65$[° C.]
Depth $d_1=0.7$ [m]
Reference depth $x_s=2$ [m]
Pressure $p_0=1$ [atm]
$p_1=1.07$ [atm]
Reference pressure $p_s=1.27$ [atm]
The reference volume of the enclosed gas (argon) is set as below.

$v_s=0.08201 \times n \times (273.15+t_1)/p_s=1$ [l]

$n=p_s/(0.08201 \times [273.15+t_1])=1.27/(0.08201 \times 338.15)=0.045796$ [mol]

$v=0.08201 \times n \times (273.15+t)/p=0.08201 \times 0.045796 \times (273.15+t)/p=3.7557 \times 10^{-1} \times (273.15+t)/p$ [l]

On the assumption that the volume of the enclosed gas (argon) at the depth x of the vertical high-temperature tank is indicated by $v_{hx}$ and the volume of the enclosed gas (argon) at the depth x of the vertical low-temperature tank is indicated by $v_{cx}$, the following equations are obtained.

$v_{hx}=3.7557 \times 10^{-3} \times 338.15 \times (273.15+t)/p=1.26999 \times (273.15+t)/p$ [l]

$v_{cx}=3.7557 \times 10^{-3} \times 288.15 \times (273.15+t)/p=1.08220 \times (273.15+t)/p$ [l]

The buoyancy F acting on the volume v of the enclosed gas (argon) in the density ρ of the liquids W1 and W2 is set as below.

F=−medium density ρ [kg]×volume v [l] of enclosed gas (argon)×gravity $g$[m/s$^2$]=−ρ×v×g[N=kg·m/s$^2$]

In addition, '−' indicates the rise in the direction opposite to the direction of the gravity g.

$p=1+0.1 \times (d_1+x) \times \rho=1.07+0.1 \times x$ $F=-9.81 \times \rho \times v=-9.81 \times \rho \times 3.7557 \times 10^{-3} \times (273.15+t)$
$p=-3.6843417 \times 10^{-2} \times (273.15+t)/p=-3.6843417 \times 10^{-2} \times (273.15+t)/(1.07+0.1 \times x)$
[N=kg·m/s$^2$]

The position energy generated by the buoyancy F acting on the volume v of the enclosed gas (argon) in the density p of the liquids W1 and W2 is set as below.

$q=x \times F=x \times 3.6843417 \times 10^{-2} \times (273.15+t)/(1.07+0.1 \times x)$ The position energy $Q_{hx}$ of the vertical high-temperature tank is obtained as the following equation 1.

$q_{hx}=x \times 0.036843417 \times 338.15/(1.07+0.1 \times x)=x \times 12.4586/(1.07+0.1 \times x)$ [J]

$Q_{hx}=\int_0^{dt-d1} 12.4586/(1.07+0.1 \times x)dx$ [Equation 1]

The position energy $Q_{cx}$ of the vertical low-temperature tank is obtained as the following equation 2.

$q_{cx}=x \times 0.036843417 \times 288.15/(1.07+0.1 \times x)=x \times 10.6143/(1.07+0.1 \times x)$ [J]

$Q_{cx}=\int_0^{dt-d1} 10.6164/(1.07+0.1 \times x)dx$ [Equation 2]

The originally generated position energy is set as below.

$Q_{hx-cx}=Q_{hx}-Q_{cx}$ [J]

The supply energy is set as below based on the following conditions.

Enclosed gas as argon (Ar)
Used mole number n=0.045796 [mol]
Molecular weight M=39.948 [g/mol]
Mass m=n×M=1.8295 [g]
Specific heat $C_p$ at constant pressure=0.5200 [J/g·° C.]
Heat capacity $Q_{cp}=m \times C_p=0.9513$ [J/° C.]
The thermal expansion caused by the energy supplied to the enclosed gas (argon) is obtained as the equation of $Q_{co}=Q_{cp} \times (t_1-t_2)=47.565$ [J].

Expansion work=originally generated position energy=$Q_{hx-cx}$ [J]

The energy $Q_{in}$ supplied to enclosed gas (argon) is obtained as $Q_{in}=Q_{co}+Q_{hx-cx}$ [J].

The efficiency η is set as below.

η=$Q_{hx-cx}/Q_{in} \times 100$[%]

As illustrated in Table 1, a relation of the depth x, the originally generated position energy, and the efficiency is expressed on the condition that the temperature $t_1$ of the vertical high-temperature tank 1 is set to 65[° C.], the temperature $t_2$ of the vertical low-temperature tank 2 is set to 15[° C.], the depth $d_1$ is set to 0.7 [m], the pressure $p_0$ is set to 1 [atm], the volume $v_s$ of the enclosed gas (argon) is set to 1 [l], the temperature is set to 65[° C.], the depth $d_s$ is set to 2 [m], and the pressure $p_s$ is set to 1.27 [atm].

When the temperature difference is 50[° C.] and the depth x is 6 [m], the originally generated position energy $Q_{hx-cx}$ is 8.19 [J] and the efficiency η is 14.69 [%]. Then, when the volume of the enclosed gas (argon) moving per second is 122.1 [l/s], the position energy of 1 [kw] is generated.

Further, when the depth x is 10 [m], the originally generated position energy $Q_{hx-cx}$ is 12.14 [J] and the efficiency η is 20.33 [%]. Then, when the volume of the enclosed gas (argon) moving per second is 82.37 [l/s], the position energy of 1 [kw] is generated.

TABLE 1

|  |  | $t_1 = 65$ |  | $t_2 = 15$ |  | Originally Generated |  |
|---|---|---|---|---|---|---|---|
| Depth x (m) | Pressure p (atm) | Volume $v_{hx}$ (l) | Position Energy $Q_{hx}$ (J) | Volume $V_{cx}$ (l) | Position Energy $Q_{cx}$ (J) | Position Energy $Q_{hx\text{-}cx}$ (J) | Efficiency η (%) |
| 0.0 | 1.07 | 1.1868 | 0.00 | 1.0114 | 0.00 | 0.00 | 0.00 |
| 1.0 | 1.17 | 1.0854 | 11.13 | 0.9250 | 9.49 | 1.64 | 3.33 |
| 2.0 | 1.27 | 0.9999 | 21.35 | 0.8521 | 18.20 | 3.15 | 6.21 |
| 3.0 | 1.37 | 0.9269 | 30.79 | 0.7899 | 26.24 | 4.55 | 8.73 |
| 4.0 | 1.47 | 0.8639 | 39.57 | 0.7362 | 33.72 | 5.85 | 10.95 |
| 5.0 | 1.57 | 0.8089 | 47.77 | 0.6893 | 40.71 | 7.06 | 12.92 |
| 6.0 | 1.67 | 0.7604 | 55.46 | 0.6480 | 47.27 | 8.19 | 14.69 |
| 7.0 | 1.77 | 0.7175 | 62.71 | 0.6114 | 53.44 | 9.27 | 16.31 |
| 8.0 | 1.87 | 0.6791 | 69.55 | 0.5787 | 59.28 | 10.27 | 17.76 |
| 9.0 | 1.97 | 0.6446 | 76.04 | 0.5493 | 64.81 | 11.23 | 19.10 |
| 10.0 | 2.07 | 0.6135 | 82.21 | 0.5228 | 70.07 | 12.14 | 20.33 |

INDUSTRIAL APPLICABILITY

The invention provides a device which stores thermal energy generated from a heat supply source in a nature and artificial social activities into a high-temperature heat storage tank filled with a liquid medium and a latent heat storage material capsule through a heat collector and continuously and stably generates a drive force and electricity efficiently by a temperature difference generated between the medium of the high-temperature heat storage tank and a liquid medium directly radiating thermal energy to sea water or into a ground of a stable heat absorption source through a heat radiator. Accordingly, since the high-temperature thermal energy and the low-temperature thermal energy are directly used for a warming operation, a water heating operation, a cooling operation, and a refrigerating operation, it is possible to drastically reduce the consumption amount of nuclear power energy and fossil fuel such as oil, coal, and a natural gas and hence to prevent the radioactive contamination and the environment destruction. Further, the drive device may be essentially used to create a new industry involved with the radiation of thermal energy, the collection of thermal energy, the storage of energy, and the like.

EXPLANATIONS OF LETTERS OR NUMERALS

1 VERTICAL HIGH-TEMPERATURE TANK
2 VERTICAL LOW-TEMPERATURE TANK
3 INSULATION WALL
4 TRAVEL BELT
5 SPROCKET
6 PENETRATION HOLE
7 HORIZONTAL COMMUNICATION PIPE
11 VOLUME VARIABLE CONTAINER AT VERTICAL HIGH-TEMPERATURE TANK
12 VOLUME VARIABLE CONTAINER AT VERTICAL LOW-TEMPERATURE TANK
100 GENERATOR
110 HEAT COLLECTOR
120 HEAT RADIATOR
115 HIGH-TEMPERATURE HEAT STORAGE TANK
116, 126 LIQUID MEDIUM
117, 127 LATENT HEAT STORAGE MATERIAL CAPSULE
125 LOW-TEMPERATURE HEAT STORAGE TANK
W1 LIQUID INSIDE VERTICAL HIGH-TEMPERATURE TANK
W2 LIQUID INSIDE VERTICAL LOW-TEMPERATURE TANK

The invention claimed is:

1. A drive device which is driven by buoyancy and thermal energy, the drive device comprising:

a vertical high-temperature tank which stores high-temperature liquid;

a vertical low-temperature tank which stores low-temperature liquid while being provided adjacent to the vertical high-temperature tank;

an insulation wall which is provided between the vertical high-temperature tank and the vertical low-temperature tank;

a travel belt which is formed in an annular shape in the insulation wall and is movable with respect to the insulation wall;

a plurality of horizontal communication pipes which causes the vertical high-temperature tank and the vertical low-temperature tank to communicate with each other across the travel belt;

a pair of volume variable containers which is provided in each of the plurality of horizontal communication pipes and is supported by each of both ends of the horizontal communication pipe while an inside thereof communicates with an inside of the horizontal communication pipe; and an enclosed gas which is enclosed in the horizontal communication pipes and the pair of volume variable containers, wherein the pair of volume variable containers includes a transfer element that is configured to transfer the enclosed gas between the volume variable container of the vertical high-temperature tank and the volume variable container of the vertical low-temperature tank so that the enclosed gas stays in the volume variable container of the vertical low-temperature tank during a downward movement and the enclosed gas stays in the volume variable container of the vertical high-temperature tank during an upward movement, and wherein the travel belt is made to travel with respect to the insulation wall due to total buoyancy difference between total buoyancy of buoyancy of the volume variable containers of the vertical high-temperature tank and total buoyancy of buoyancy of the volume variable containers of the vertical low-temperature tank among a plurality of the pair of volume variable containers supported by the travel belt through the horizontal communication pipes.

2. The drive device according to claim 1, wherein each of the pair of volume variable containers is a pressure variable container which is deformed by a pressure of the liquid, the volume variable container of the vertical high-temperature tank is supported on a forward side of the horizontal communication pipe in a travel direction, and the volume variable container of the vertical low-temperature tank is supported on a rear side of the horizontal communication pipe in the travel direction, and wherein the transfer element is a pressure difference of the liquid corresponding to the depth of the liquid of the volume variable container of the vertical high-temperature tank and the volume variable container of the vertical low-temperature tank.

3. The drive device according to claim 1 or 2, further comprising:

a heat collector;

a high-temperature heat storage tank which is filled with a liquid medium and a latent heat storage material capsule;

a heat radiator; and a low-temperature heat storage tank which is filled with a liquid medium and a latent heat storage material capsule, wherein the liquid of the vertical high-temperature tank is directly returned to the high-temperature heat storage tank storing heat collected by the heat collector or is returned thereto through a heat exchanger, and wherein the liquid of the vertical low-temperature tank is directly returned to the low-temperature heat storage tank storing heat by radiation of the heat radiator or is returned thereto through a heat exchanger.

4. The drive device according to claim 1, further comprising:

a heat collector;

a high-temperature heat storage tank which is filled with a liquid medium and a latent heat storage material capsule; and a heat radiator, wherein the liquid of the vertical high-temperature tank is directly returned to the high-temperature heat storage tank storing heat collected by the heat collector or is returned thereto through a heat exchanger, and wherein the liquid of the vertical low-temperature tank is directly returned to the heat radiator or is returned thereto through a heat exchanger.

* * * * *